Dec. 27, 1949     P. T. FORD     2,492,792
APPARATUS FOR DRYING AND HEATING MINERAL AGGREGATES
Filed July 17, 1947     2 Sheets-Sheet 1

Inventor
Perry T. Ford

By W. S. McDowell
Attorney

Dec. 27, 1949 P. T. FORD 2,492,792
APPARATUS FOR DRYING AND HEATING MINERAL AGGREGATES
Filed July 17, 1947 2 Sheets-Sheet 2

Inventor
Perry T. Ford

By W. S. McDowell
Attorney

Patented Dec. 27, 1949

2,492,792

UNITED STATES PATENT OFFICE 2,492,792

APPARATUS FOR DRYING AND HEATING MINERAL AGGREGATES

Perry T. Ford, Columbus, Ohio

Application July 17, 1947, Serial No. 761,491

3 Claims. (Cl. 259—158)

The present invention relates to apparatus utilized in the preparation of bituminous mixes of the type employed in road paving, surfacing or similar operations. More specifically, this invention deals with apparatus for drying and heating mineral aggregates such as gravel, granite chips, and the like, preparatory to the admixture thereof with a quantity of bituminous material to form the ultimate surfacing mix.

In the preparation of bituminous mixes of the type utilized in road paving, a relatively large quantity of mineral aggregates, such as crushed stone, gravel, granite chips and the like are introduced to a quantity of bituminous material, such as asphalt, which is usually maintained in a fluid or semi-fluid state at relatively elevated temperatures, prior to pouring or laying operations. To insure proper binding and adhesion between the bituminous material and the mineral aggregate, it is prerequisite that the latter be introduced in a dry state, as any moisture contained within or upon the surfaces of the relatively finely divided aggregate will tend to diminish or preclude proper adhesion between the two constituents of the mix. Further, it has been found advantageous to introduce the aggregate at relatively elevated temperatures corresponding with the temperatures of the bituminous material in order that the resultant temperature of the mix will remain substantially constant, or to the extent that the temperature of the bituminous material should not be decreased below a predetermined and desired degree.

Accordingly, it is the general object of this invention to provide a machine capable of efficiently and effectively drying and heating relatively large quantities of mineral aggregate prior to the introduction thereof to the bituminous constituents of a surfacing mix.

It is another object of this invention to provide a machine of the above character which embodies a compartmented rotary drum having internally disposed fuel burners, and in which a quantity of mineral aggregate is introduced for batch drying in successive stages within the separate compartments of the drum; and wherein a given quantity of the mineral aggregate is efficiently agitated and scattered within the individual compartments of the drum in the presence of heat produced by the fuel burners contained therein, and after receiving initial drying within one of the compartments of the drum, the batch may be transferred to the supplemental and adjoining compartments of the drum, whereupon a second fresh batch of aggregate may be introduced to the emptied compartment for heat treatment in order that a batch-flow may be had at relatively frequent intervals from one end of the drum to the other, with raw or unprocessed aggregate being discharged from the opposite end.

It is still a further object of this invention to provide novel means associated with the rotary drum for effecting the successive transfer of batches of aggregate from one compartment to another of the drum, and consequently to discharge the heat treated aggregate from the drum for mixing with the bituminous constituent within a pug mill.

For a further and more complete understanding of the present invention, reference is made to the following description and the accompanying drawings wherein.

Figure 1:
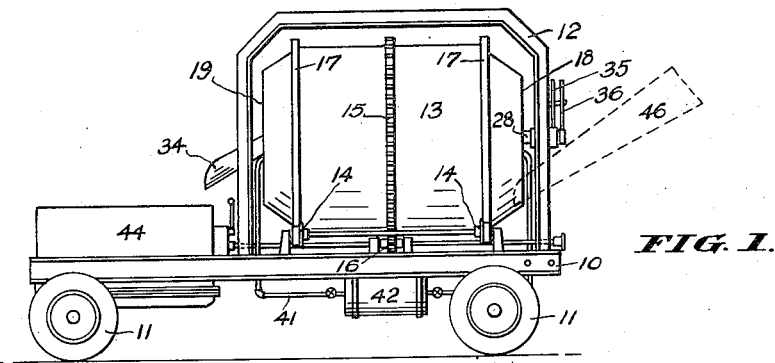
Fig. 1 is a side elevational view of an aggregate treating machine formed in accordance with the present invention, and mounted for road transportation upon a mobile base.

With reference to the drawings, it will be seen that the present invention makes use of a substantially rectangular base frame or bed 10 supported for mobility by forward and rear sets of ground wheels 11, an upstanding skeleton frame 12, preferably formed from a plurality of angle-iron beams, and a barrel-shaped hollow drum 13 supported within the skeleton frame upon a pair of transversely spaced trucks 14 for rotation about its longitudinal axis. The drum 13 is provided intermediate its length, in the usual manner, with a circular band gear 15 which is maintained in meshing engagement with a relatively smaller driven gear 16 which may be driven by any suitable power source, not shown. The drum 13 is further provided toward its ends, and along its peripheral surface with a pair of longitudinally spaced circular tracks 17 by which the drum is supported for rotation in cradle-like fashion upon the associated rotatable wheels of the drum-supporting trucks 14. Each of the wheels of the trucks 14 is provided with circular flanges which engage the inner surface of the band track 17, to prevent the drum from becoming longitudinally displaced with respect to its cradle support.

The ends of the drum are inwardly tapered, and are provided with axially disposed openings defining an intake opening 18, and a discharge opening 19. Disposed internally of the drums and extending transversely between the inner walls thereof is a partition wall 20 provided with an axially or centrally disposed opening 21, and serving to divide the drum internally into two separate but communicating compartments, 22 and 23 respectively. Disposed in each of these compartments and rigidly secured to the inner walls of the drum, are a plurality of blades or bucket devices 24, the latter being pitched relative to the inner wall of the drum in a manner to scoop up and elevate aggregates contained within its associated compartment upon rotation of the drum in a counterclockwise direction, as viewed from the intake end of the drum, and to discharge or spill the aggregate as each of the blades reaches a substantially maximum point of elevation. In this manner, aggregate contained with each compartment is elevated and cascaded by the blades upon rotation of the drum to insure a thorough scattering or mixing and exposing of the aggregate to the atmosphere within the compartment. Disposed adjacent to and attached to either side of the partition wall 20 are a pair of frustro-conical plates 25 which serve to direct aggregate contained within each of the compartments 22 and 23 to the elevating blades 24, and prevents such aggregate from building up against the partition wall in a manner to preclude proper elevation by the blades.

Toward the inlet end of the drum, the skeleton frame 12 is provided with a transversely disposed bearing plate 26 which serves to support a circular bushing or bearing 27 in axial alignment with the drum. Rotatably received within the bearing 27 is the outer surface of a pair of coaxially mounted shafts 28 and 29. These shafts extend internally of the drum through the inward opening 18 thereof, and are disposed substantially along the longitudinal axis of the drum. The outer shaft 28 terminates at, and is connected with, a fastening bracket 30 carried upon the lower surface of an angularly inclined transfer chute 31. At the same time, the inner or smaller diameter shaft 29 passes freely through an opening formed in the fastening plate and the chute, to extend within the second compartment 23 of the drum, and terminates just internally of the outlet opening 19. The end of the shaft 29 is rigidly connected, as at 32, with a connection housing 33 rigidly attached to the lower surface of an angularly inclined discharge chute 34. As shown particularly in Fig. 2 of the drawings, the transfer chute 31 is disposed within the first compartment 22 of the drum and extends in an angularly inclined manner between the vertical plane of the elevating blades 24 and slightly through the centrally disposed opening 21 formed in the partition wall. The transfer chute 31 is movable upon rotation of the outer shaft 28 between positions effecting and preventing the transfer of aggregate, elevated by the blades 24, from the compartment 22 to the compartment 23.

Figure 2:
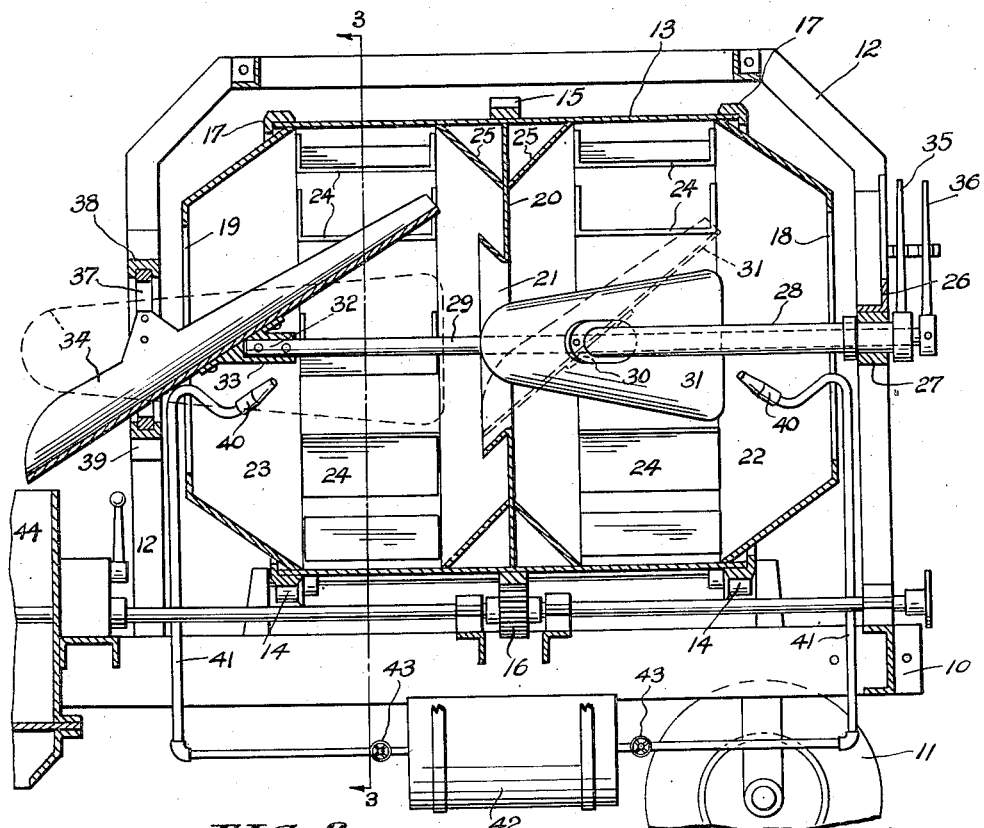
Fig. 2 is an enlarged vertical sectional view taken through the heat-treating drum of the machine disclosed in Fig. 1.
Figure 3:
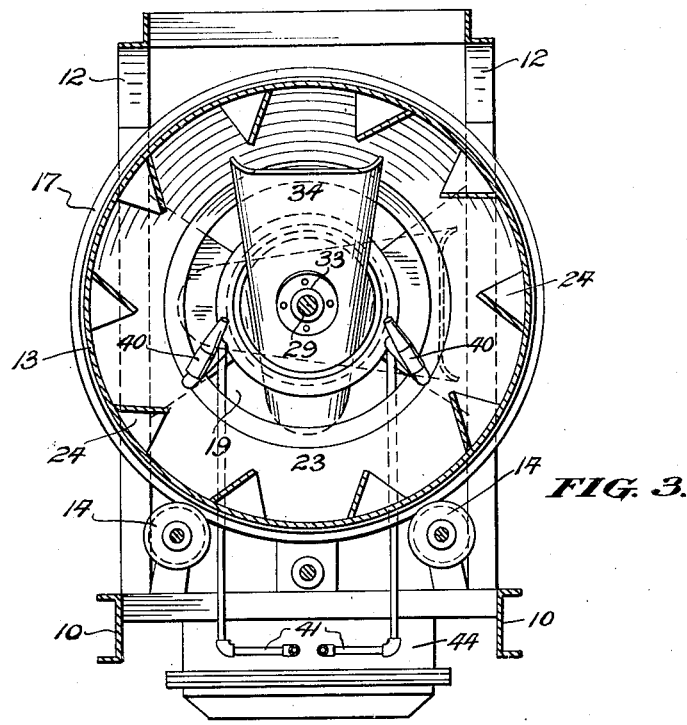
Fig. 3 is a transverse vertical sectional view taken along a plane indicated by the line 3—3 of Fig. 2.

The outer end of the outer shaft 28 is provided with a manually operable lever 35 by which rotation is imparted to the shaft to consequently position the transfer chute 31 in a vertically inclined manner, whereby aggregate may be transferred from one compartment to the other, or in a horizontally inclined position, as indicated by full lines of Fig. 2, whereupon the transfer of aggregate is precluded. It will be understood, that the manually operable lever 35 may be easily replaced by remotely controlled pneumatic or hydraulically actuated mechanisms capable of imparting the necessary rotation to the shaft 28. In a similar manner, the inner shaft 29 is provided at its outer ends with a lever 36, by which the discharge chute 34 may be moved to provide for the discharge of aggregate from within the second compartment 23 of the drum. The discharge chute 34 is positioned so as to extend between the vertical plane of the elevating blades 24 disposed within the compartment 23, to a position beyond the skeleton frame 12. The discharge chute 34 is attached toward its outer end to a circular ring 37 which is rotatably maintained within a circular channel groove 38 formed within a transversely extending plate 39 positioned between the side members of the skeleton frame 12. In this manner, rotation of the inner shaft 29 imparts movement to the discharge chute 34, such as will either effect or prevent the discharge of aggregate from within the compartment 23 exteriorly of the drum, upon rotation of the drum, and upon the elevation of the aggregate by the blades 24.

Introduced internally of each of the compartments 22 and 23, by way of the inlet opening 18 and the outlet opening 19, are a pair of fuel-burning nozzles 40 positioned at the ends of fuel-supplying conduits 41 emanating from a fuel reservoir 42 disposed below the drum and carried by the bed frame 10. The reservoir 42 stores liquid fuel in a pressurized condition, and upon the opening of suitable shut off valves 43, interposed within each of the supply conduits 41, liquid fuel is forced upwardly through the conduit to be discharged from the burner nozzles 40, and may be ignited to produce twin jets of flame within each of the compartments of the drum. The nozzles 40 are directed upwardly and inwardly of the compartments, to provide a peak flame disposed within the vertical plane of the elevating blades 24, in order that aggregate elevated by the blades may be cascaded or scattered through the peak of the flame, as the aggregate is spilled from the blades substantially at the top of the drum. In this manner, relatively finely divided aggregate is subjected to the intense heat produced by the flames of the burner nozzle 40, and due to the scattering or cascading effect of the aggregate, substantially the entire surface of the individual aggregate particles comes in direct contact with the flame, in order that moisture carried by the individual particles of the aggregate may be vaporized, and ultimately carried off through either the inlet or outlet openings of the drum.

Positioned adjacent the discharge end of the drum 13, and supported by the bed frame 10 is an open topped pug mill 44 of the type generally used to effect the mixing of aggregate with the bituminous constituent of a road-paving mix, wherein the bituminous material, such as asphalt, is maintained at relatively elevated temperatures in a fluid or semi-fluid state. The pug mill is provided, in the usual manner, with suitable agitating devices for effecting the thorough mixing of the aggregate with the bituminous constituents before the same is discharged to the road surface for paving operations. As seen particularly in Figs. 1 and 2 of the drawings, the discharge chute 34 extends exteriorly of the drum and its frame and terminates above the open end of the pug mill in order that aggregate being discharged from the compartment 23 of the drum may be introduced to the pug mill for mixing with the bituminous material contained therein.

Figure 4:
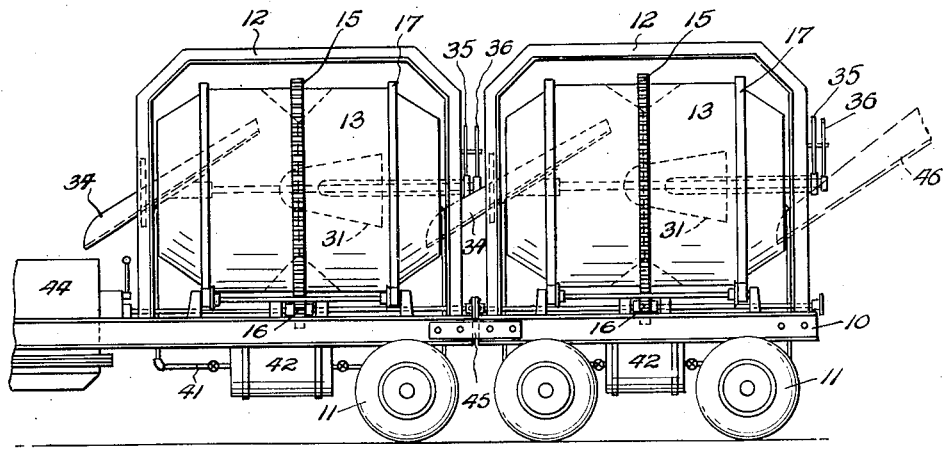
Fig. 4 is a side elevational view of a multiple drum aggregate-treating machine embodying the features of the present invention.

Fig. 4 of the drawings discloses a multiple drum assembly utilized particularly in extreme cold or wet weather conditions where a relatively longer drying or heating period is necessary to completely dry the mineral aggregate of the paving mix. In this form, a supplemental mobile drum unit is coupled, as at 45, to the rear of the bed frame 10 of the primary unit, and instead of the discharge chute 34 of the supplemental unit serving to introduce aggregate to the pug mill, the same will be positioned within the inlet opening 18 of the primary unit, in order that batches of aggregate may be introduced initially through the inlet opening 18 of the supplemental unit, to be successively transferred through each of the compartments of the combined units. In this manner, a substantially continuous batch-flow of aggregate is maintained throughout the compartments of the two drums without a substantial increase in the operating cycle, or drying time, as would be necessary with but a single unit.

In the operation of the present invention, a desired quantity of mineral aggregate is introduced to the drum by way of the inlet opening 18 thereof, and by means of an independently operated skip or shovel mechanism 46. It will here be understood, that the source of supply for the mineral aggregate usually consists of relatively large piles of crushed stone, gravel, which are disposed at advantageous locations along the road side. As such, the mineral constituent or aggregate is exposed to the elements of the weather, and is oftentimes extremely wet or cold when initially used for the mixing operations. The use of a skip 46 to introduce the aggregate within the dums, provides a convenient and easy means for elevating the aggregate from ground level to the level of the intake opening of the drum. As a batch of mineral aggregate is positioned within the first compartment of the drum, rotation is imparted to the drum in order that the aggregate may be scattered and cascaded in the presence of the flame produced by the fuel burners 40. Upon initial drying of a batch of aggregate within the first compartment, the transfer chute 31 is positioned in a horizontally inclined manner, as indicated in full lines of Fig. 2, to prevent the transfer of aggregate to the second compartment of the drum. After a predetermined time interval, the initial batch of aggregate contained within the first compartment is transferred, by way of the transfer chute 31, to the second compartment of the drum where the same undergoes a second and supplemental heating operation for another given interval of time. After the transfer of the first batch from the first compartment of the drum to the second, a fresh batch of aggregate may be introduced to the first compartment to undergo initial heat treating operations at the same time the first batch is undergoing its final heat treating operation. After a predetermined time interval within the second compartment, the discharge chute 34 is moved to its position of vertical inclination whereby the finally heated and dried aggregate is discharged from the drum and into the pug mill 44 for admixture with the bituminous constituent of the mix.

In view of the foregoing, it will be seen that the present invention provides a highly efficient and useful machine for heat treating mineral aggregates in order that the latter may be subsequently introduced to a bituminous material in a dry condition, whereby a firm adhesive union may be had between the individual particles of the aggregate and the bituminous binder. The present invention is characterized by its mechanical efficiency, its structural simplicity, and its ease of operation.

While I have disclosed my invention in its specific embodiment when utilized for the heating and drying of minerals preparatory to their admixture with bituminous materials, nevertheless it will be understood that my improved apparatus may be used in other operations involving the mixing, and heating if desired, of various other materials, and with or without the steps of adding bituminous materials thereto. One of the particular advantages of the multi-compartment drum resides in the ability to produce batches of treated materials at intervals of short duration, thus providing for the handling of treated materials in a more facile and convenient manner, and when relatively large batches of treated materials are produced at intervals of much longer duration. For instance, when two drums are coupled, as shown in Fig. 4, a treated batch of materials may be produced at intervals corresponding to but one-fourth of the time required if a single large drum were used having but one compartment. In this manner, the outlet of the machine releases treated materials in a more continuous and steady flow than has been obtained heretofore with the conventional single drum. Generally, machines formed in accordance with the present invention are characterized by their multiplicity of uses, the same being adapted for the heat treatment of sand, the calcination of limestone, the mixing of cementitious materials and constituents thereof, and generally in heating, drying, and mixing operations.

I claim:

1. Mineral-handling apparatus comprising a frame, a hollow drum mounted within said frame for rotation about its longitudinal axis, said drum being formed at one end with an inlet opening and at its opposite end with a discharge opening, a partition wall formed with an axially disposed opening and positioned transversely within the drum, said wall dividing the drum longitudinally into a pair of separate but communicating compartments, a plurality of mineral-elevating blades positioned in each of said compartments and carried by the inner wall of said drum, a pair of co-axially mounted shafts rotatably carried by said frame and extending longitudinally within the drum through the inlet opening thereof, one of said shafts terminating within the first compartment of the drum, the other of said shafts terminating within the second compartment thereof, a transfer chute carried by the first shaft in angular relation thereto, said transfer chute occupying a position between the first and second compartments of the drum and movable upon rotation of the first shaft between positions providing for or precluding the transfer of minerals elevated within the first compartment to the second compartment, a discharge chute carried by said second shaft and extending through the discharge opening of the drum, said discharge chute being movable upon rotation of said second shaft between positions providing for or precluding the discharge of minerals elevated within the second compartment of the drum upon rotation of the latter, means connected with each of said shafts and disposed exteriorly of said drum at one end thereof for imparting rotation to each of said shafts, and fuel burners positioned in each of the compartments of the drum for heating minerals contained therein.

2. Mineral-handling apparatus comprising a frame, a hollow drum mounted within said frame for rotation about its longitudinal axis, said drum being formed at one end with an inlet opening and at its opposite end with a discharge opening, a transverse partition wall formed with an axially disposed opening and positioned intermediately of the ends of said drum and dividing the latter longitudinally into a pair of separate but communicating compartments, a plurality of mineral-elevating blades positioned in each of said compartments and carried by the inner wall of said drum, a pair of coaxially mounted shafts rotatably carried by said frame and extending longitudinally within the drum through the inlet opening thereof, one of said shafts terminating within the first compartment of the drum, the other of said shafts terminating within the second compartment thereof, a transfer chute carried by the first shaft in angular relation thereto, said transfer chute occupying a position between the first and second compartments of the drum and movable upon rotation of the first shaft between positions providing for or precluding the transfer of minerals elevated within the first compartment to the second compartment, a discharge chute carried by said second shaft and extending through the discharge opening of the drum, said discharge chute being movable upon rotation of said second shaft between positions providing for or precluding the discharge of minerals elevated within the second compartment of the drum upon rotation of the latter, means connected with each of said shafts exteriorly of the inlet end of said drum for imparting rotation to said shafts to control the positions of said transfer and discharge chutes, and fuel burners introduced within said first and second compartments by way of said inlet and outlet openings for heating minerals elevated by the mineral-elevating blades positioned in each of said compartments.

3. In apparatus for drying mineral aggregates; an axially rotatable drum provided internally with a plurality of separate but communicating compartments and formed at one end with an inlet opening and at its opposite end with a discharge opening; a plurality of elevating blades carried within each of the compartments of said drum for elevating mineral aggregates introduced therein upon rotation of said drum; fuel burners extending through the inlet and discharge openings of said drum and terminating within each of the compartments thereof for heating mineral aggregates introduced within said drum and elevated by said blades; a plurality of coaxially mounted rotatable shafts extending axially through the inlet opening of said drum, one each of said shafts terminating within each of the compartments of said drum; a transfer chute carried at the inner end of one of said shafts in angular relation thereto and extending between two of the compartments of said drum, said transfer chute being movable upon rotation of said one of said shafts to positions permitting or preventing the transfer of aggregate from one compartment to another of said drum; a discharge chute extending through the discharge opening of said drum and carried at the end of another of said shafts, said discharge chute being movable upon rotation of said last-named shaft to positions permitting or preventing the discharge of aggregate from said drum by way of said discharge opening; and means connected with each of said shafts exteriorly of the inlet opening of said drum for imparting rotation to said shafts and for controlling the positions of said chutes within said drum.

PERRY T. FORD.

REFERENCES CITED

The following references are of record in the file of this patent:

UNITED STATES PATENTS

| Number | Name | Date |
| --- | --- | --- |
| 1,609,072 | Elze | Nov. 30, 1926 |
| 1,619,145 | McMillan | Mar. 1, 1927 |
| 2,167,243 | Lichtenberg et al. | July 25, 1939 |
| 2,282,467 | Faber | May 12, 1942 |
| 2,305,938 | Turnbull | Dec. 22, 1942 |

FOREIGN PATENTS

| Number | Country | Date |
| --- | --- | --- |
| 124,966 | Switzerland | Nov. 30, 1926 |